United States Patent
Wang et al.

(10) Patent No.: US 10,742,961 B2
(45) Date of Patent: Aug. 11, 2020

(54) DEPTH SENSING APPARATUS WITH SELF-CALIBRATION AND SELF-CALIBRATION METHOD THEREOF

(71) Applicant: Industrial Technology Research Institute, Hsinchu (TW)

(72) Inventors: Te-Mei Wang, Hsinchu (TW); Zen-Chung Shih, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 196 days.

(21) Appl. No.: 15/255,164

(22) Filed: Sep. 2, 2016

(65) Prior Publication Data

US 2017/0064288 A1    Mar. 2, 2017

Related U.S. Application Data

(60) Provisional application No. 62/213,127, filed on Sep. 2, 2015.

(30) Foreign Application Priority Data

Dec. 17, 2015   (CN) .......................... 2015 1 0946892

(51) Int. Cl.
*H04N 17/00*        (2006.01)
*H04N 13/246*       (2018.01)
(Continued)

(52) U.S. Cl.
CPC ....... *H04N 13/246* (2018.05); *G01B 11/2504* (2013.01); *G01B 11/2513* (2013.01);
(Continued)

(58) Field of Classification Search
CPC ............ G06T 2207/30244; G06T 7/73; G06T 3/0093; G06T 5/006; G06T 2219/2004;
(Continued)

(56) References Cited

U.S. PATENT DOCUMENTS 6,433,840 B1 *   8/2002   Poppleton ............ H04N 3/2335
                                                              348/745
7,623,274 B1   11/2009   Lefevere
(Continued)

FOREIGN PATENT DOCUMENTS

CN    1645240     7/2005
CN    101706957   5/2010
(Continued)

OTHER PUBLICATIONS

Kimura et al., "Projector Calibration using Arbitrary Planes and Calibrated Camera", Proceedings of the 2007 IEEE Computer Society Conference on Computer Vision and Pattern Recognition (CVPR'07), Jun. 2007, pp. 1-2.
(Continued)

*Primary Examiner* — Daniel Chang
(74) *Attorney, Agent, or Firm* — JCIPRNET

(57) ABSTRACT

A depth sensing apparatus with self-calibration and a self-calibration method thereof are provided. The depth sensing apparatus includes a projection apparatus, an image capturing apparatus and a calibration module. The projection apparatus projects a calibration pattern and a depth computation pattern to a reference plane based on a predefined calibration pattern and a predefined depth computation pattern. The image capturing apparatus captures an image including the calibration pattern and the depth computation pattern. The calibration module coupled to the image capturing apparatus adjusts apparatus parameters of the depth sensing apparatus to calibrate a depth computation deviation according to the calibration pattern of the image, the predefined calibration pattern and a predefined lookup table corresponding to the predefined calibration pattern.

14 Claims, 12 Drawing Sheets

(51) Int. Cl.
*H04N 5/222* (2006.01)
*G01B 11/25* (2006.01)
*H04N 13/239* (2018.01)

(52) U.S. Cl.
CPC ......... *H04N 5/2226* (2013.01); *H04N 13/239* (2018.05); *H04N 17/002* (2013.01)

(58) Field of Classification Search
CPC ... G06T 7/85; G06T 7/80; G06T 2207/10028; G06T 7/70; G06T 2200/08; G06T 7/33; G06T 7/60; G06T 15/20; H04N 9/3185; H04N 13/0246; H04N 13/0271; H04N 13/0425; H04N 1/00045; H04N 9/3194; H04N 13/271; H04N 13/246; H04N 9/3147; H04N 13/128; H04N 21/4122; H04N 2213/003; G06F 3/0425; G06K 9/48; G03B 37/04; G03B 17/54; G03B 21/13; G03B 21/142; G03B 21/147; G09G 2320/0693; G01B 11/25; G01B 11/2513; G01B 11/2504; G01B 11/2518; G01B 21/042; G01C 11/06
USPC ........ 348/187, 745, 46, 47, 159, 136, 333.1, 348/744; 382/181, 199, 294, 195, 154
See application file for complete search history.

(56) References Cited

U.S. PATENT DOCUMENTS

| | | | |
|---|---|---|---|
| 8,866,889 | B2 | 10/2014 | Masalkar et al. |
| 9,235,899 | B1* | 1/2016 | Kirmani ............... H04N 13/271 |
| 2002/0033955 | A1* | 3/2002 | Knighton ............ G01B 11/2518 356/615 |
| 2003/0086614 | A1* | 5/2003 | Shen .......................... G06T 1/20 382/199 |
| 2007/0036432 | A1 | 2/2007 | Xu et al. |
| 2007/0075997 | A1* | 4/2007 | Rohaly ..................... G06T 7/80 345/419 |
| 2008/0279446 | A1* | 11/2008 | Hassebrook ....... G01B 11/2513 382/154 |
| 2011/0134114 | A1* | 6/2011 | Rais ..................... H04N 13/254 345/419 |
| 2011/0310376 | A1* | 12/2011 | Shim ....................... G01S 7/497 356/4.07 |
| 2013/0201291 | A1 | 8/2013 | Liu et al. |
| 2014/0168367 | A1 | 6/2014 | Kang |
| 2014/0168378 | A1 | 6/2014 | Hall |
| 2014/0232825 | A1 | 8/2014 | Gotschlich |
| 2014/0368613 | A1* | 12/2014 | Krupka ................... G01S 17/36 348/46 |
| 2015/0030250 | A1* | 1/2015 | Poyil ....................... G06K 9/48 382/195 |
| 2015/0189267 | A1* | 7/2015 | Kaji ......................... G06T 7/80 348/187 |
| 2016/0134851 | A1* | 5/2016 | Grundhofer ....... G01B 11/2504 348/745 |

FOREIGN PATENT DOCUMENTS

| | | |
|---|---|---|
| CN | 102572505 | 7/2012 |
| CN | 103337066 | 10/2013 |
| CN | 103500471 | 1/2014 |
| CN | 103636201 | 3/2014 |
| CN | 103745452 | 4/2014 |
| CN | 103817699 | 5/2014 |
| CN | 104331896 | 2/2015 |
| CN | 104574388 | 4/2015 |
| TW | 201426161 | 7/2014 |
| WO | 2005055145 | 6/2005 |
| WO | 2014053158 | 4/2014 |

OTHER PUBLICATIONS

Grossberg et al., "Making One Object Look Like Another: Controlling Appearance Using a Projector-Camera System", Proceedings of the 2004 IEEE Computer Society Conference on Computer Vision and Pattern Recognition (CVPR'04), Jun. 2004, pp. I-452-I-459.

Falcao et al., "Plane-Based Calibration of a Projector-Camera System", International Programme in VIsion & roBOTics (VIBOT) Master, 2008, pp. 1-12.

Raskar et al., "Multi-Projector Displays Using Camera-Based Registration", IEEE Visualization 1999 Conference, Oct. 1999, pp. 161-168.

Sukthankar et al., "Smarter Presentations: Exploiting Homography in Camera-Projector Systems", IEEE International Conference on Computer Vision (ICCV'01), Jul. 2001, pp. 247-253.

"Office Action of Taiwan Counterpart Application", dated Jul. 25, 2016, p. 1-p. 4, in which the listed references were cited.

"Office Action of China Counterpart Application", dated Oct. 27, 2017, p. 1-p. 6, in which the listed references were cited.

* cited by examiner

DEPTH SENSING APPARATUS WITH SELF-CALIBRATION AND SELF-CALIBRATION METHOD THEREOF

CROSS-REFERENCE TO RELATED APPLICATION

This application claims the priority benefit of U.S. provisional application Ser. No. 62/213,127, filed on Sep. 2, 2015, and China application serial no. 201510946892.9, filed on Dec. 17, 2015. The entirety of each of the above-mentioned applications is hereby incorporated by reference herein and made a part of this specification.

BACKGROUND

Technical Field

The disclosure relates to a depth sensing apparatus with self-calibration and a self-calibration method thereof.

Description of Related Art

Along with development of technology, today's depth sensing apparatus has been able to obtain and store three-dimensional (3D) information of objects and environment. In collaboration with different post-processing algorithms, the 3D information can be further applied to 3D modelling, motion recognition, etc.

The depth sensing apparatus based on stereo vision requires accurate apparatus information to calculate depth information. Therefore, before the official start of use, the depth sensing apparatus is required to be calibrated to obtain the accurate apparatus information. For example, a conventional calibration method is to use an external calibration mechanism to assist obtaining the apparatus information. On the other hand, the depth sensing apparatus may also analyse information of feature points of images captured in different viewing angles to obtain the apparatus information.

Generally, a calibration effect achieved through a specific calibration mechanism is preferred, though non-professionals are not easy to obtain the aforementioned calibration mechanism, and are lack of related operation training. Therefore, once the depth sensing apparatus sustains a temperature variation, an external force impact, shock, etc., to cause distortion of the depth information, the depth sensing apparatus generally has to be sent back to the manufacturer for calibration, which is rather inconvenient in application. Therefore, how to effectively calibrate the depth sensing apparatus is still a target pursued by related technicians of the field.

SUMMARY OF THE DISCLOSURE

The disclosure is directed to a depth sensing apparatus with self-calibration and a self-calibration method, by which calibration is performed in time and current apparatus information of the depth sensing apparatus is obtained to accurately acquire depth information.

An embodiment of the disclosure provides a depth sensing apparatus with self-calibration including a projection apparatus, an image capturing apparatus and a calibration module. The projection apparatus projects a calibration pattern and a depth computation pattern to a reference plane based on a predefined calibration pattern and a predefined depth computation pattern, where the calibration pattern is merged with the depth computation pattern. The image capturing apparatus captures an image including the calibration pattern and the depth computation pattern. The calibration module is coupled to the image capturing apparatus, and adjusts a plurality of apparatus parameters of the depth sensing apparatus to calibrate a depth computation deviation according to the calibration pattern of the image, the predefined calibration pattern and a predefined lookup table corresponding to the predefined calibration pattern.

Another embodiment of the disclosure provides a self-calibration method, which is adapted to a depth sensing apparatus. The self-calibration method includes following steps. A calibration pattern and a depth computation pattern are projected to a reference plane based on a predefined calibration pattern and a predefined depth computation pattern, where the calibration pattern is merged with the depth computation pattern. An image including the calibration pattern and the depth computation pattern is captured. A plurality of apparatus parameters of the depth sensing apparatus is adjusted to calibrate a depth computation deviation according to the calibration pattern of the image, the predefined calibration pattern and a predefined lookup table corresponding to the predefined calibration pattern.

Another embodiment of the disclosure provides another depth sensing apparatus with self-calibration including a projection apparatus, a first image capturing apparatus, a second image capturing apparatus and a calibration module. The projection apparatus projects a calibration pattern and a depth computation pattern to a reference plane based on a predefined calibration pattern and a predefined depth computation pattern, where the calibration pattern is merged with the depth computation pattern. The first image capturing apparatus captures a first image including the calibration pattern and the depth computation pattern, and the second image capturing apparatus captures a second image including the calibration pattern and the depth computation pattern. The calibration module is coupled to the first image capturing apparatus and the second image capturing apparatus, and adjusts a plurality of apparatus parameters of the depth sensing apparatus to calibrate a depth computation deviation according to the calibration patterns in the first image and the second image, the predefined calibration pattern and a predefined lookup table corresponding to the predefined calibration pattern.

According to the above descriptions, in the depth sensing apparatus with self-calibration and the self-calibration method, the calibration pattern and the depth computation pattern are first projected to the reference plane to capture an image including the calibration pattern and the depth computation pattern. Then, the apparatus parameters of the depth sensing apparatus are adjusted to calibrate the depth computation deviation according to the calibration pattern, the predefined calibration pattern and the predefined lookup table. In this way, the depth sensing apparatus is able to efficiently perform self-calibration in real-time, so as to maintain accuracy of the depth information in calculation. Further, in another proposed depth sensing apparatus, multiple images including the calibration patterns and the depth computation patterns are captured and used in adjusting the apparatus parameters of the depth sensing apparatus to calibrate the depth computation deviation.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings

DESCRIPTION OF EMBODIMENTS

The disclosure provides a depth sensing apparatus with self-calibration and a self-calibration method. The depth sensing apparatus projects a calibration pattern and a depth computation pattern on a reference plane according to a predefined calibration pattern and a predefined depth computation pattern, and captures an image including the calibration pattern and the depth computation pattern. Through image processing and analysis, the depth sensing apparatus determines a difference between the calibration pattern and the predefined calibration pattern to calibrate a plurality of apparatus parameters of the depth sensing apparatus. The apparatus parameters, for example, include internal parameters and external parameters of an image capturing apparatus. The internal parameters are, for example, optical center, focal length, etc. The external parameters are used for describing a shift, rotation relationship between the image capturing apparatus and a projection apparatus. In general, the default apparatus parameters are usually obtained by the manufacturer during the production of the depth sensing apparatus. To be more specific, after the lens distortion correction and the stereo rectification, the manufacturer may further obtain the default apparatus parameters, and store those parameters in the depth sensing apparatus. However, the depth sensing apparatus may sustain a temperature variation, an external force impact or shock, which leads the default apparatus parameters become inappropriate for calculating the depth information. Thus, a depth sensing apparatus with self-calibration and a self-calibration method for the apparatus parameters are provided in the following description.

Figure 1A:
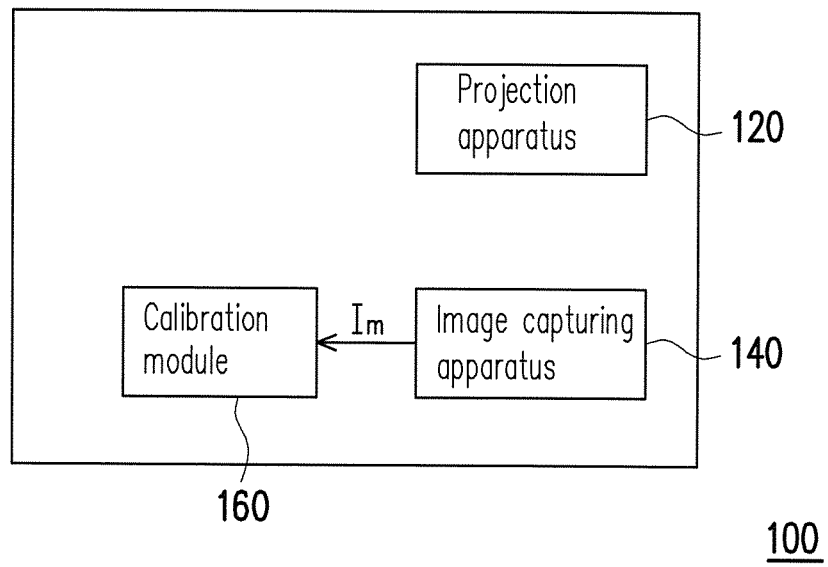
FIG. 1A is a schematic diagram of a depth sensing apparatus according to an embodiment of the disclosure.

FIG. 1A is a schematic diagram of a depth sensing apparatus according to an embodiment of the disclosure. Referring to FIG. 1A, the depth sensing apparatus 100 includes a projection apparatus 120, an image capturing apparatus 140 and a calibration module 160. In the present embodiment, the projection apparatus 120 may project a calibration pattern and a depth computation pattern based on a predefined calibration pattern and a predefined depth computation pattern. The projection apparatus 120 is, for example, a combination of a laser light source and a diffractive optical element (DOE), a combination of a light-emitting diode (LED) light source and a light source mask or a projector or a pico projector capable of projecting light spots.

Corresponding to the design of the projection apparatus 120, the image capturing apparatus 140 is, for example, an infrared (IR) image capturing apparatus, a combination of the IR image capturing apparatus and an RBG image capturing apparatus or other image capturing apparatus capable of capturing images. In the present embodiment, the image capturing apparatus 140 is used for obtaining an image $I_m$ including the calibration pattern and the depth computation pattern.

The calibration module 160 is coupled to the image capturing apparatus 140, and receives the image $I_m$ including the calibration pattern and the depth computation pattern from the image capturing apparatus 140. The calibration module 160 adjusts apparatus parameters of the depth sensing apparatus 100 to calibrate a depth computation deviation according to the predefined calibration pattern, a predefined lookup table corresponding to the predefined calibration pattern and the calibration pattern of the image $I_m$. In the present embodiment, the calibration module 160 can be a software program executed by a processor (not shown). The processor is, for example, a micro-controller, an embedded controller, a central processing unit (CPU), a field programmable gate array (FPGA), an application-specific integrated circuit (ASIC) or a similar device. The aforementioned processor may further perform a depth computation according to the depth computation pattern in the image $I_m$. It should be noted that in other embodiments, the calibration module 160 is, for example, implemented through a specific circuit structure.

Figure 2A:
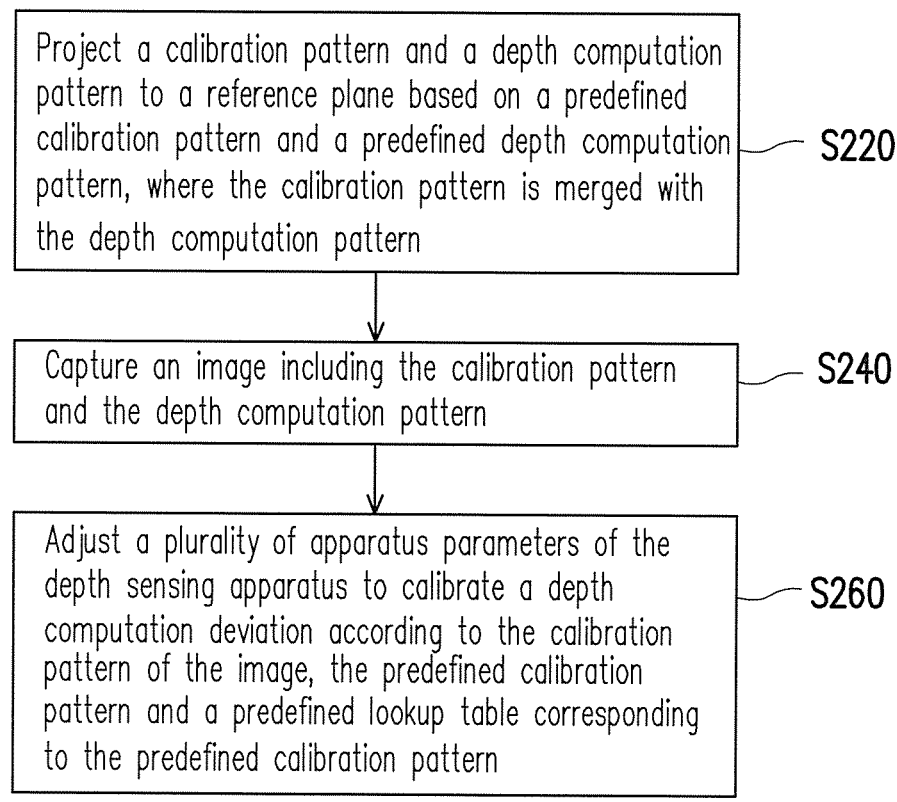
FIG. 2A is a flowchart illustrating a self-calibration method according to an embodiment of the disclosure.

FIG. 2A is a flowchart illustrating a self-calibration method according to an embodiment of the disclosure. The self-calibration method of the present embodiment is adapted to the depth sensing apparatus 100 of FIG. 1A. Referring to FIG. 1A and FIG. 2A, the projection apparatus 120 projects a calibration pattern and a depth computation pattern to a reference plane based on a predefined calibration pattern and a predefined depth computation pattern, where the calibration pattern is merged with the depth computation pattern (step S220).

To be specific, as described above, the projection apparatus 120 can be implemented through different devices or device combinations, for example, through a combination of a laser light source and a diffractive optical element. When the projection apparatus 120 includes the laser light source and the diffractive optical element, the diffractive optical element is designed corresponding to the predefined depth computation pattern and the predefined calibration pattern. Therefore, when a laser light emitted by the laser light source is projected to the flat and non-mirror reference plane through the diffractive optical element, the depth computation pattern and the calibration pattern is formed on the reference plane.

Similarly, in another embodiment, when the projection apparatus 120 includes an LED light source and a light source mask, the light source mask is designed corresponding to the predefined depth computation pattern and the predefined calibration pattern. Therefore, when a light emitted by the LED light source is projected to the flat and non-mirror reference plane through the light source mask, the depth computation pattern and the calibration pattern is formed on the reference plane. In still another embodiment of the disclosure, when the projection apparatus 120 is a projector or a pico projector capable of projecting light spots, through a control of a projected light, the depth sensing apparatus 100 may form the depth computation pattern and the calibration pattern on the reference plane according to the predefined depth computation pattern and the predefined calibration pattern.

Figure 3C:
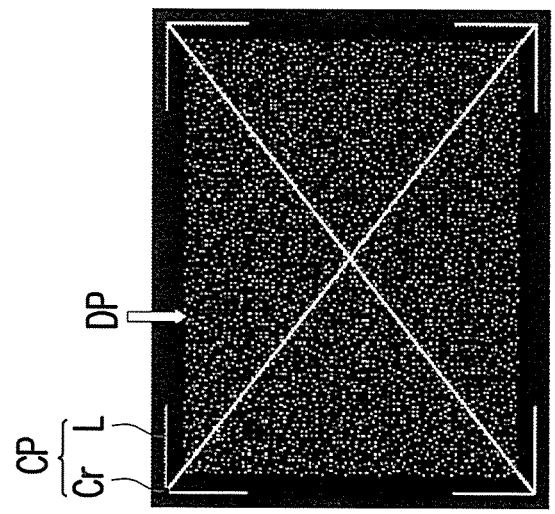
FIG. 3A to FIG. 3I are respectively schematic diagrams of a predefined depth computation pattern and a predefined calibration pattern according to an embodiment of the disclosure.
Figure 3B:
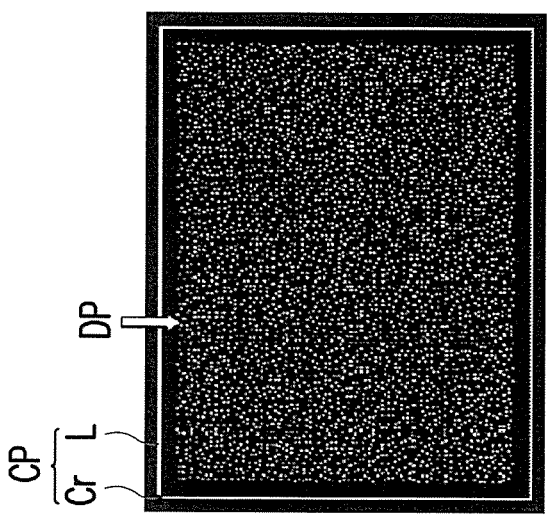
Figure 3A:
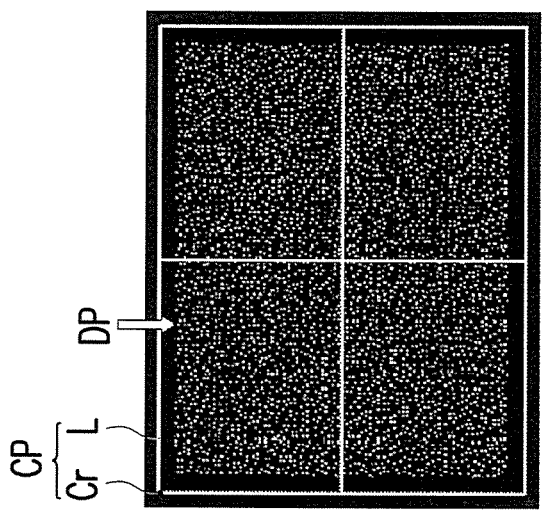
Figure 3F:
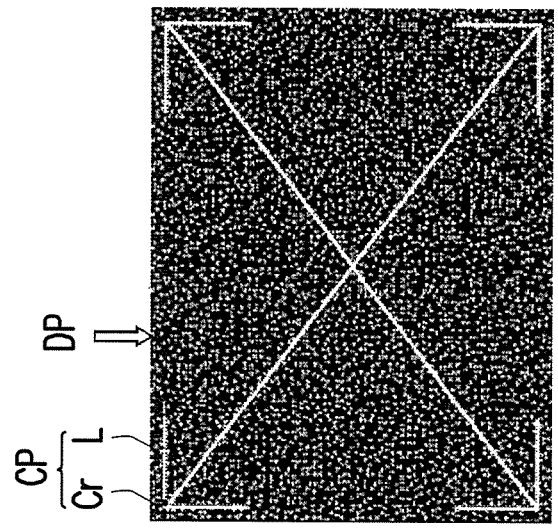
Figure 3E:
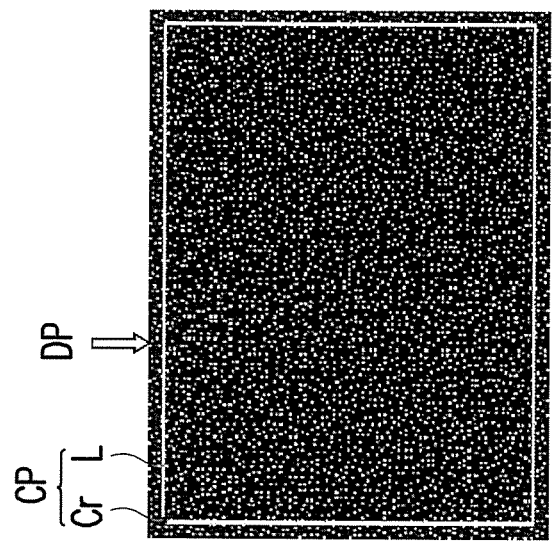
Figure 3D:
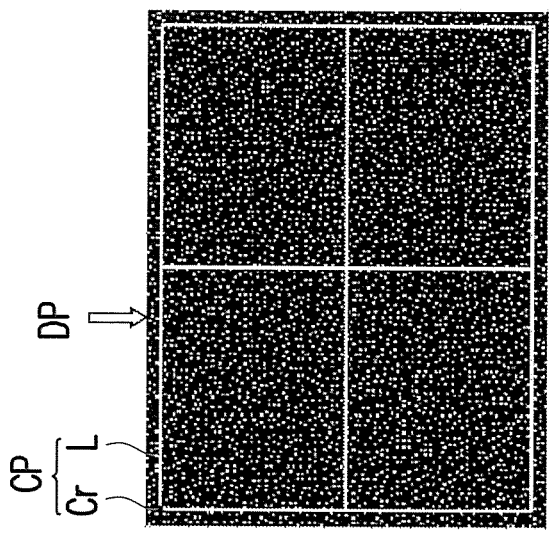
Figure 3G:
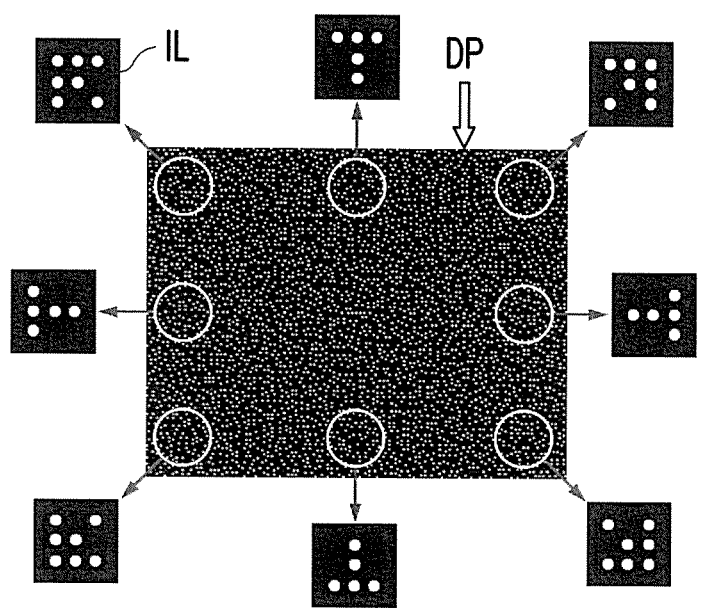
Figure 3H:
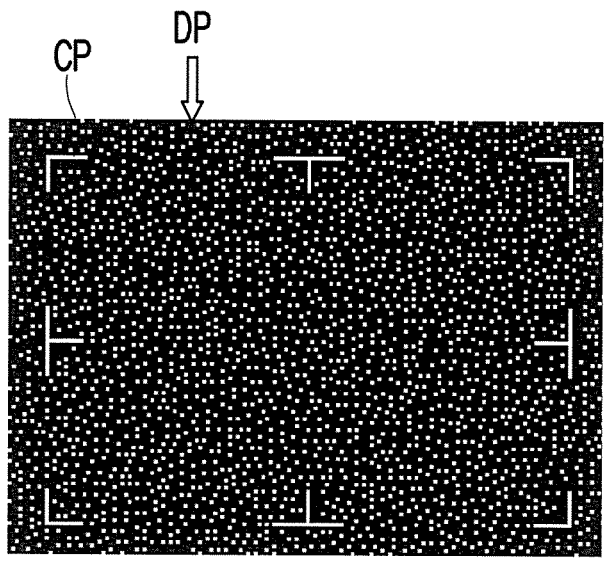
Figure 3I:
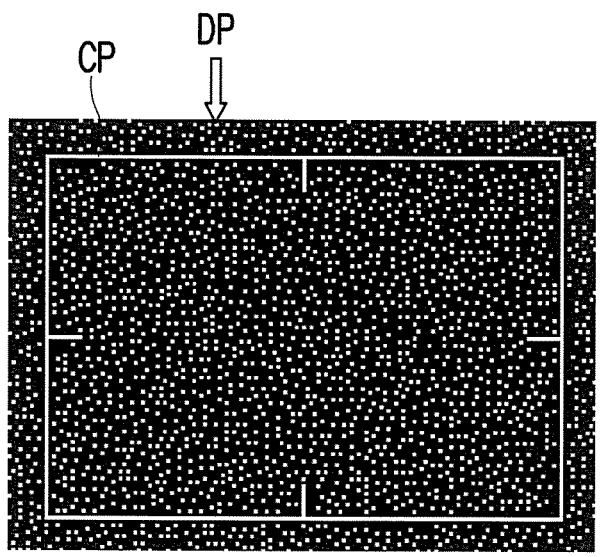

FIG. 3A to FIG. 3I are respectively schematic diagrams of the predefined depth computation pattern and the predefined calibration pattern according to an embodiment of the disclosure. Referring to FIG. 3A to FIG. 3F, FIG. 3H and FIG. 3I, the predefined depth computation pattern DP, for example, includes a plurality of dot regions. The predefined calibration pattern CP includes a plurality of predefined pattern features, and the predefined pattern features includes a plurality of lines L (i.e. linear regions) and a plurality of crossing points Cr between the lines L. The predefined calibration pattern CP may have different designs, for example, a "Iii"-form predefined calibration pattern CP shown in FIG. 3A and FIG. 3D, a square-form predefined calibration pattern CP shown in FIG. 3B and FIG. 3E or a double arrow cross-form predefined calibration pattern CP shown in FIG. 3C and FIG. 3F. Further, other designs of the predefined calibration pattern CP are shown in FIG. 3H and FIG. 3I. On the other hand, when the predefined depth computation pattern DP and the predefined calibration pattern CP are overlapped and merged while taking a pattern center as a reference, a coverage range of the predefined calibration pattern CP can be greater than a coverage range of the predefined depth computation pattern DP (for example, FIG. 3A to FIG. 3C), or the coverage range of the predefined calibration pattern CP can be smaller than the coverage range of the predefined depth computation pattern DP (for example, FIG. 3D to FIG. 3F, FIG. 3H and FIG. 3I).

In an embodiment of the disclosure, the predefined calibration pattern CP is hidden in the predefined depth computation pattern DP. As shown in FIG. 3G, the predefined calibration pattern CP is composed of a part of dot regions and is hidden in the predefined depth computation pattern DP. The predefined calibration pattern CP further includes a plurality of identification labels IL respectively located at different locations on the predefined depth computation pattern DP, and the identification labels IL may serve as a main reference for identifying the predefined calibration pattern CP from the predefined depth computation pattern DP. To be specific, the predefined calibration patterns CP of FIG. 3D to FIG. 3I are, for example, presented in the predefined depth computation pattern DP in this way.

Referring to FIG. 1A, FIG. 2A, FIG. 3A to FIG. 3I, regarding the calibration pattern and the depth computation pattern projected on the reference plane by the projection apparatus 120 according to the predefined depth computation pattern DP and the predefined calibration pattern CP, the image capturing apparatus 140 further captures an image $I_m$ including the calibration pattern and the depth computation pattern (step S240), and transmits the image $I_m$ to the calibration module 160. The calibration module adjusts a plurality of apparatus parameters of the depth sensing apparatus 100 to calibrate a depth computation deviation according to the calibration pattern of the image $I_m$, the predefined calibration pattern CP and a predefined lookup table corresponding to the predefined calibration pattern CP (step S260).

Generally, when the projection apparatus 120 projects the depth computation pattern and the calibration pattern on the reference plane according to the predefined depth computation pattern DP and the predefined calibration pattern CP, the depth computation pattern and the calibration pattern can be different to the predefined depth computation pattern DP and the predefined calibration pattern CP due to factors such as inclination of the depth sensing apparatus 100, distance between the depth sensing apparatus 100 and the reference plane, and deviation of the projection apparatus 120. Therefore, before the official use, a plurality of previous calibration patterns can be projected to a predefined plane based on the predefined calibration pattern CP under a plurality of different known skew angles and a plurality of different known distances of the depth sensing apparatus 100. Now, a plurality of previous positions of a plurality of previous pattern features of a plurality of previous calibration patterns in a plurality of previous images and a plurality of previous geometric relations between the previous pattern features may serve as predefined parameters to establish a predefined lookup table in the depth sensing apparatus 100. The previous positions of the previous pattern features are, for example, corresponding pixels of the previous pattern features on the previous images. The previous geometric relations include the number of spaced pixels of the previous pattern features in the previous images, though the disclosure is not limited thereto.

Figure 4A:
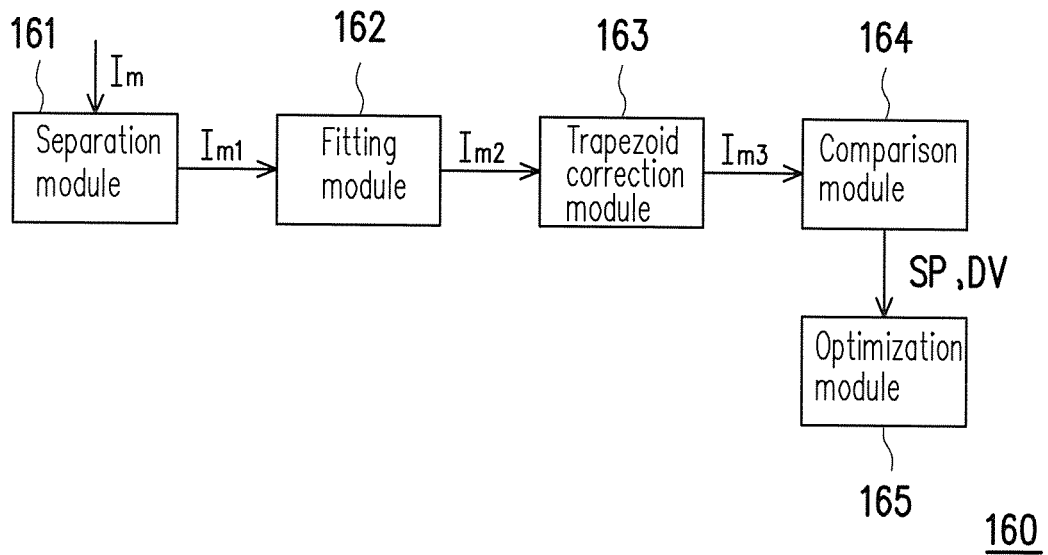
FIG. 4A is a schematic diagram of a calibration module according to an embodiment of the disclosure.
Figure 5A:
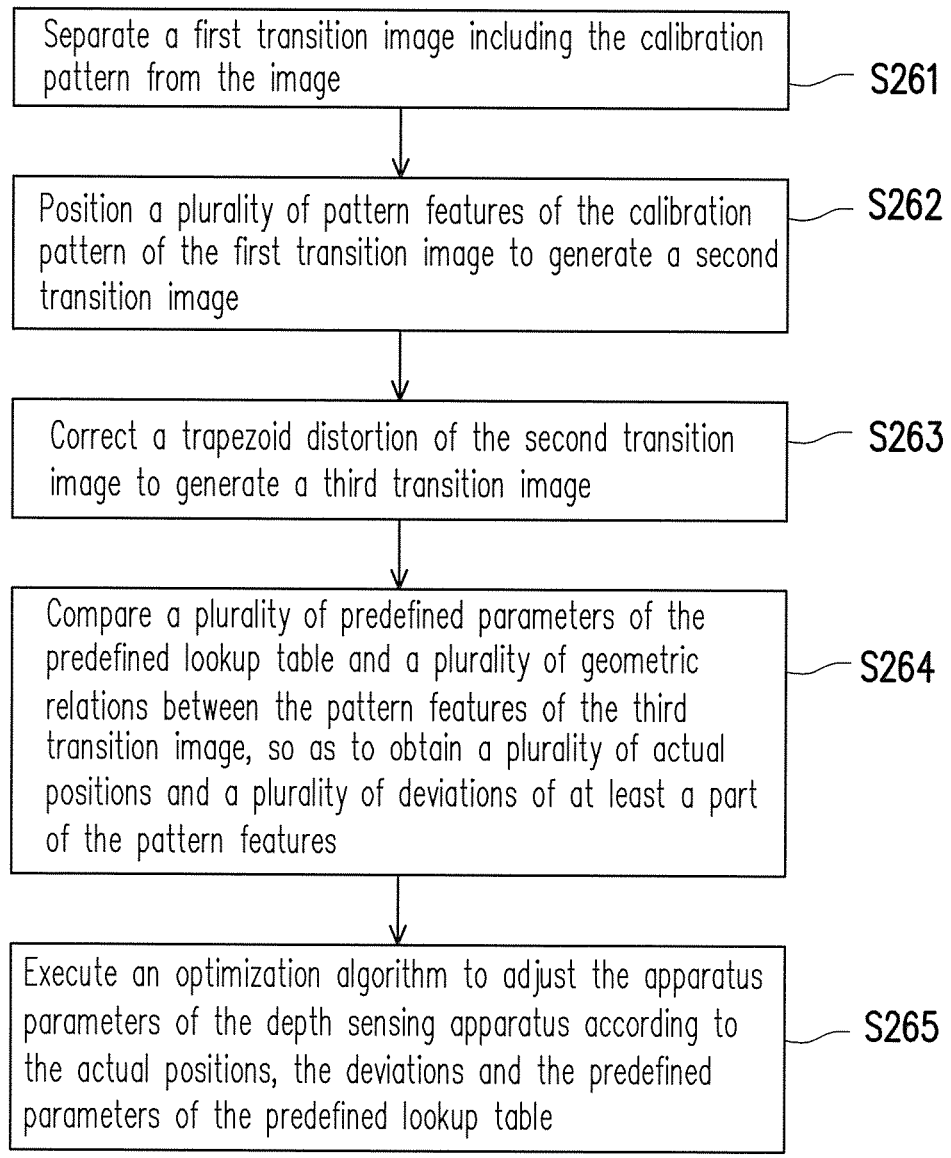
FIG. 5A is a flowchart illustrating a method for adjusting apparatus parameters according to a calibration pattern, a predefined calibration pattern and a predefined lookup table corresponding to the predefined calibration pattern.

FIG. 4A is a schematic diagram of a calibration module according to an embodiment of the disclosure. FIG. 5A is a flowchart illustrating a method for adjusting apparatus parameters according to the calibration pattern, the predefined calibration pattern and the predefined lookup table corresponding to the predefined calibration pattern. Referring to FIG. 4A and FIG. 5A, the calibration module 160 further includes a separation module 161, a fitting module 162, a trapezoid correction module 163, a comparison module 164 and an optimization module 165. The separation module 161 is coupled to the image capturing apparatus 140. When the calibration module 160 receives the image $I_m$ including the calibration pattern and the depth computation pattern from the image capturing apparatus 140, the separation module 161 separates a first transition image $I_{m1}$ including the calibration pattern from the image $I_m$ (step S261).

In detail, the separation module 161 determines a connectivity property of each of pixels according to each of the pixels of the image $I_m$ and a plurality of neighboring pixels neighbored to the each of the pixels. For example, the separation module 161 takes the number of neighboring pixels of each of the pixels as a threshold. When the number of the neighboring pixels of one pixel is not greater than the threshold, the separation module 161 takes the aforementioned pixel as a pixel with weak connectivity. Comparatively, when the number of the neighboring pixels of one pixel is greater than the threshold, the separation module 161 takes the aforementioned pixel as a pixel with strong connectivity. Then, the separation module 161 excludes the pixels with weak connectivity in the image $I_m$, and executes an erosion algorithm to the pixels with strong connectivity to further thin a pixel group with strong connectivity, so as to separate the first transition image $I_{m1}$ having the calibration pattern.

Generally, the calibration pattern in the image $I_m$ is the calibration pattern projected by the projection apparatus 120 based on the predefined calibration pattern CP, so that corresponding to a plurality of predefined pattern features of the predefined calibration pattern CP, the calibration pattern also has a plurality of pattern features. Since the calibration pattern in the image $I_m$ has the pattern features relevant to each other, it generally corresponds to the pixel group with strong connectivity. Therefore, the separation module 161 may separate the first transition image $I_{m1}$ having the calibration pattern from the image $I_m$ by retaining the pixel group with strong connectivity.

Referring to FIG. 4A and FIG. 5A, after the separation module 161 separates the first transition image $I_{m1}$ having the calibration pattern, the fitting module 162 coupled to the separation module 161 receives the first transition image $I_{m1}$, and positions a plurality of pattern features of the calibration pattern of the first transition image $I_{m1}$ to generate a second transition image $I_{m2}$ (step S262). In detail, since the first transition image $I_{m1}$ separated by the separation module 161 may further include pixel groups of non-calibrate pattern, the fitting module 162 further positions the pattern features of the calibration pattern of the first transition image $I_{m1}$ to generate the second transition image $I_{m2}$.

In the present embodiment, the fitting module 162, for example, directly compares the first transition image $I_{m1}$ with the predefined calibration pattern CP to position the pattern features of the calibration pattern of the first transition image $I_{m1}$, though the disclosure is not limited thereto. To be specific, in another embodiment, the fitting module 162, for example, compares the predefined lookup table with the first transition image $I_{m1}$ to position the pattern features of the calibration pattern. In other words, the pattern features of the calibration pattern of the first transition image $I_{m1}$ are positioned by using the predefined parameters in the predefined lookup table. In another embodiment, when the projection apparatus 120 uses a laser light source, the fitting module 162, for example, takes a zero order spot of the first transition image $I_{m1}$ at an image center as a reference to convert the first transition image $I_{m1}$ to position the pattern features of the calibration pattern of the first transition image $I_{m1}$. To be specific, since the pattern features of the first transition image include a plurality of lines, a Hough transform can be adopted to accurately position the pattern features of the calibration pattern of the first transition image $I_{m1}$.

Referring to FIG. 4A and FIG. 5A, the trapezoid correction module 163 is coupled to the fitting module 162, and receives the second transition image $I_{m2}$, and corrects a trapezoid distortion of the second transition image $I_{m2}$ to generate a third transition image $I_{m3}$ (step S263). To be specific, in the flow of self-calibration, the trapezoid distortion is probably caused by an inclination configuration of the depth sensing apparatus 100 such that an image capturing axis and the reference plane are not a right angle which is orthogonal. Now, the trapezoid correction module 163 may determine whether the second transition image $I_{m2}$ has the trapezoid distortion according to an image edge of the second transition image $I_{m2}$ or a plurality of pattern features of the second transition image $I_{m2}$, and correspondingly corrects the trapezoid distortion of the second transition image $I_{m2}$ to generate the third transition image $I_{m3}$.

Referring to FIG. 4A and FIG. 5A, the comparison module 164 is coupled to the trapezoid correction module 163, and receives the third transition image $I_{m3}$, and compares a plurality of predefined parameters of the predefined lookup table and a plurality of geometric relations between pattern features of the third transition image $I_{m3}$, so as to obtain actual positions SP and deviations DV of at least a part of the pattern features (step S264). In the present embodiment, the comparison module 164 calculates the geometric relations between the actual positions SP and the deviations DV of the pattern features in the third transition image $I_{m3}$. Similar to the previous pattern features in the previous images and the previous geometric relations, the actual positions SP of the pattern features in the third transition image $I_{m3}$ are, for example, pixels of the pattern features on the third transition image $I_{m3}$, and the geometric relations between the pattern features in the third transition image $I_{m3}$ include the number of spaced pixels of the pattern features in the third transition image $I_{m3}$, though the disclosure is not limited thereto.

Further, the comparison module 164 compares the aforementioned actual positions SP, the geometric relations between the pattern features and the predefined parameters of the predefined lookup table to obtain the deviations DV of the pattern features. Since the predefined parameters of the predefined lookup table correspond to previous positions of a plurality of previous pattern features of the previous calibration patterns in the previous images and the previous geometric relations between a plurality of the previous pattern features, it can be determined whether the actual positions SP of the pattern features in the third transition image $I_{m3}$ are deviated from the previous positions of the previous pattern features of the corresponding previous image, so as to calculate the deviations DV of the pattern features of the third transition image $I_{m3}$.

Referring to FIG. 4A and FIG. 5A, the optimization module 165 is coupled to the comparison module 164, and receives the obtained actual positions SP and the deviations DV of the at least a part of the pattern features, and executes an optimization algorithm to adjust the apparatus parameters of the depth sensing apparatus 100 according to the actual positions SP, the deviations DV and the predefined parameters of the predefined lookup table (step S265). In the present embodiment, the optimization module 165, for example, executes a Levenberg-Marquardt optimization algorithm to obtain a plurality of calibrated apparatus parameters of the depth sensing apparatus 100. To be specific, the optimization module 165 obtains the calibrated apparatus parameters of the depth sensing apparatus 100 such as an actual deviation angle, an actual inclination angle, an actual focal position, an actual main point position, etc., based on data such as the actual positions SP of the pattern features, the deviations DV of the pattern features, an image resolution (an image width and an image length) of the third transition image $I_{m3}$, etc., and settings such as the number of execution times of the optimization algorithm, a stop threshold, etc. The optimization module 165 takes the aforementioned calibrated apparatus parameters as the apparatus parameters of the depth sensing apparatus 100, and the depth sensing apparatus 100 may calibrate the depth computation deviation and accurately calculate the depth information in a subsequent depth computation procedure.

It should be noted that the optimization module 165 may also execute an optimization algorithm such as a Gauss-Newton method, QR decomposition, singular value decomposition, etc., and is not limited to execute the Levenberg-Marquardt optimization algorithm.

Figure 6A:
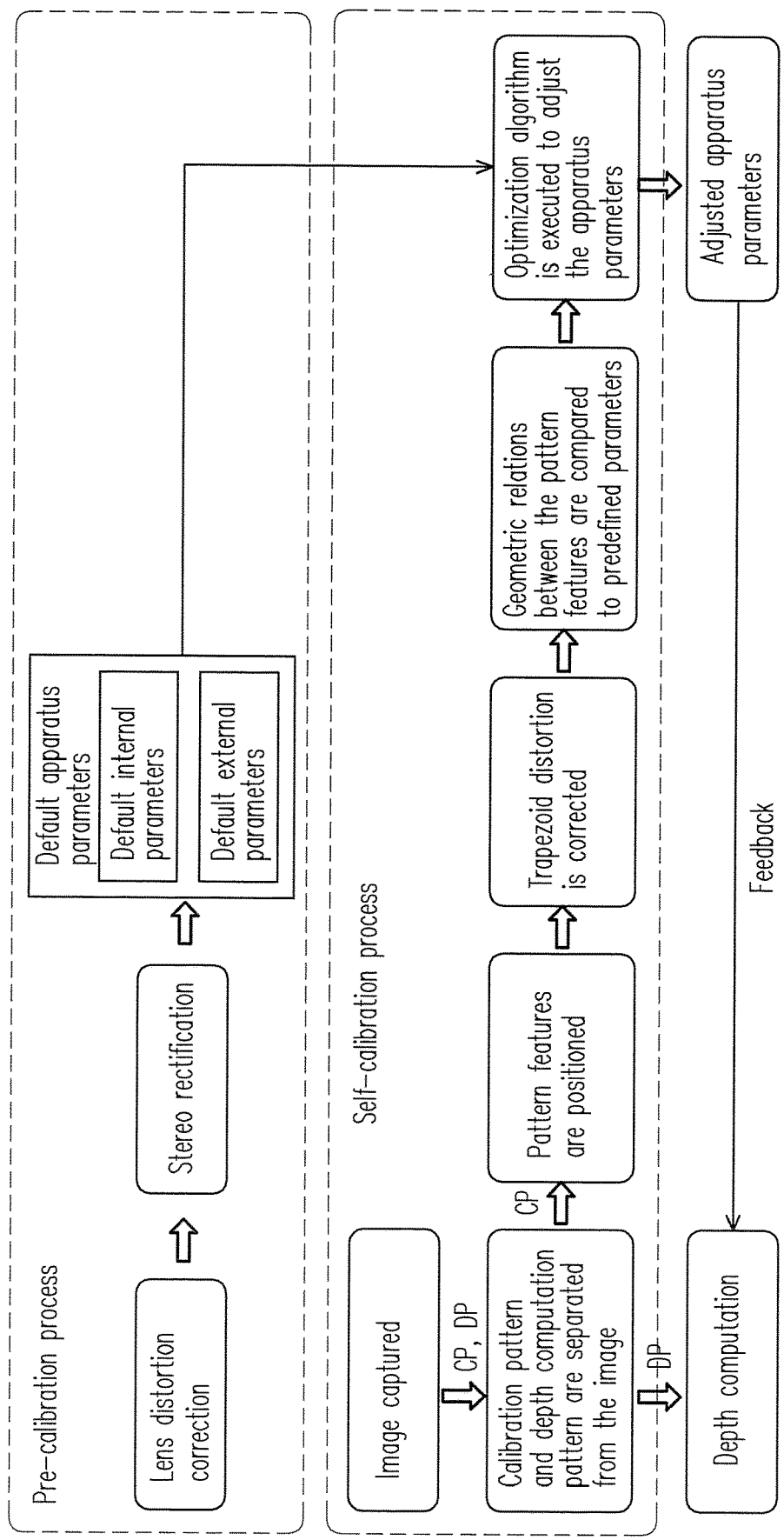
FIG. 6A is a schematic diagram of a calibration process according to an embodiment of the disclosure.

FIG. 6A is a schematic diagram of a calibration process according to an embodiment of the disclosure. Referring to FIG. 6A, during the production of the depth sensing apparatus 100, a pre-calibration process is performed by the manufacturer. Specifically, the lens distortion correction and the stereo rectification are successively executed to obtain the default apparatus parameters including the default internal parameters and the default external parameters.

Further, when using the depth sensing apparatus 100, a self-calibration process may be performed before acquiring the depth information. To be more specific, the image including the calibration pattern CP and the depth computation pattern DP is first obtained, and the first transition image including the calibration pattern CP is separated from the image.

After the first transition image including the calibration pattern CP is obtained, the remain procedure of the self-calibration process is then performed on the first transition image. The detail of the self-calibration process is already illustrated in FIG. 4A and the related embodiment, so it is not repeated herein.

Referring to FIG. 6A, in an embodiment of the present disclosure, after adjusting and updating the apparatus parameters of the depth sensing apparatus 100, the depth sensing apparatus 100 further separates a sub-image including the depth computation pattern DP from the image, and executes the subsequent depth computation procedure with the sub-image. Since the apparatus parameters of the depth sensing apparatus 100 have been adjusted by the calibration module 160, the depth computation deviation is calibrated, and the depth information is then accurately calculated by the depth sensing apparatus 100 based on the sub-image including the depth computation pattern DP.

Figure 1B:
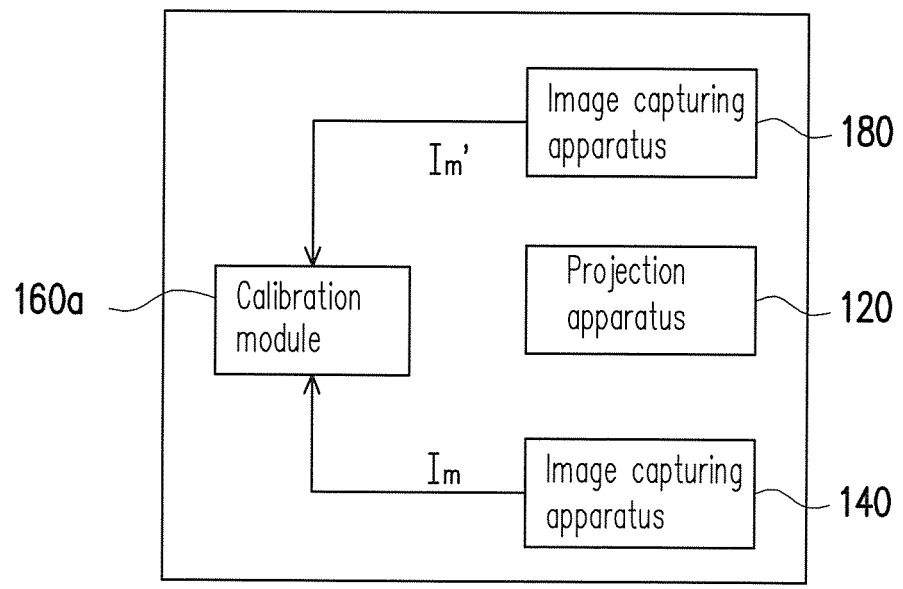
FIG. 1B is a schematic diagram of a depth sensing apparatus according to another embodiment of the disclosure.
Figure 2B:
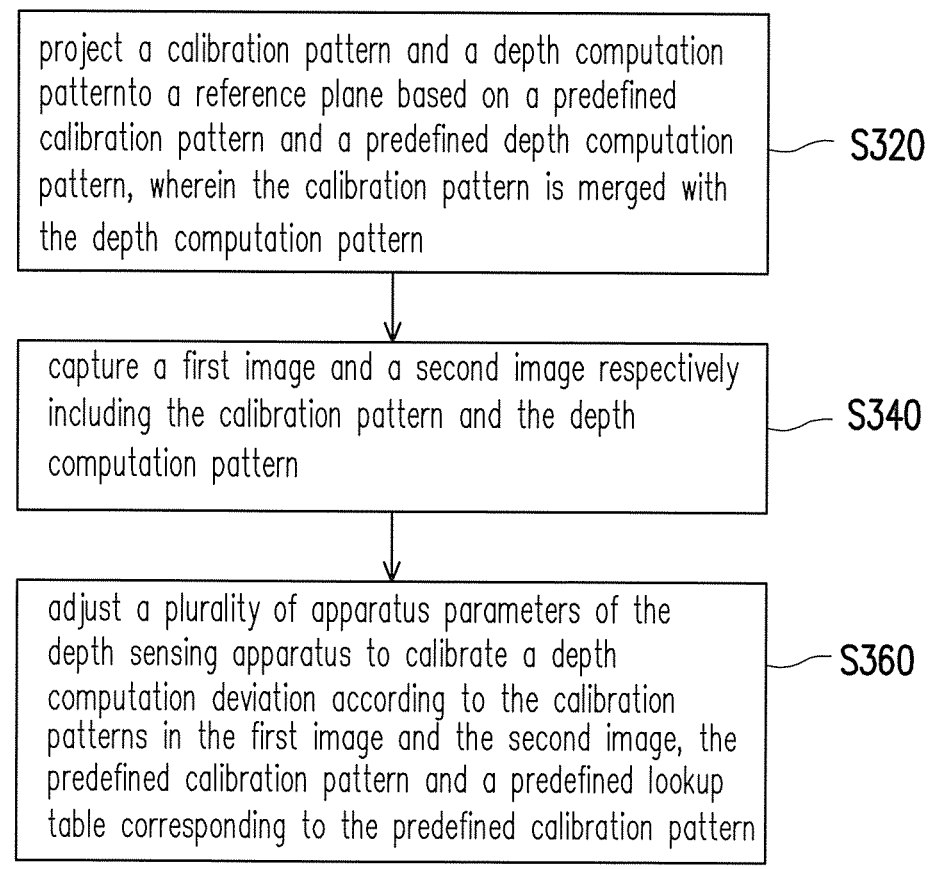
FIG. 2B is a flowchart illustrating a self-calibration method according to another embodiment of the disclosure.

Another depth sensing apparatus is also provided in the disclosure. FIG. 1B is a schematic diagram of a depth sensing apparatus according to another embodiment of the disclosure. FIG. 2B is a flowchart illustrating a self-calibration method according to another embodiment of the disclosure. Referring to FIG. 1B and FIG. 2B, the depth sensing apparatus 100a includes two image capturing apparatuses 140, 180 (the first image capturing apparatus and the second image capturing apparatus). Thus, after the calibration pattern and the depth computation pattern are projected to the reference plane based on the predefined calibration pattern and the predefined depth computation pattern by the projection apparatus 120 (step S320), two images $I_m$, $I_m'$ (the first image and the second image) respectively including the calibration pattern and the depth computation pattern are captured by the image capturing apparatuses 140, 180 (step S340), and a plurality of apparatus parameters of the depth sensing apparatus 100a are adjusted by a calibration module 160a to calibrate the depth computation deviation according to the calibration patterns in the images $I_m$, $I_m'$, the predefined calibration pattern and the predefined lookup table corresponding to the predefined calibration pattern (step S360).

Figure 4B:
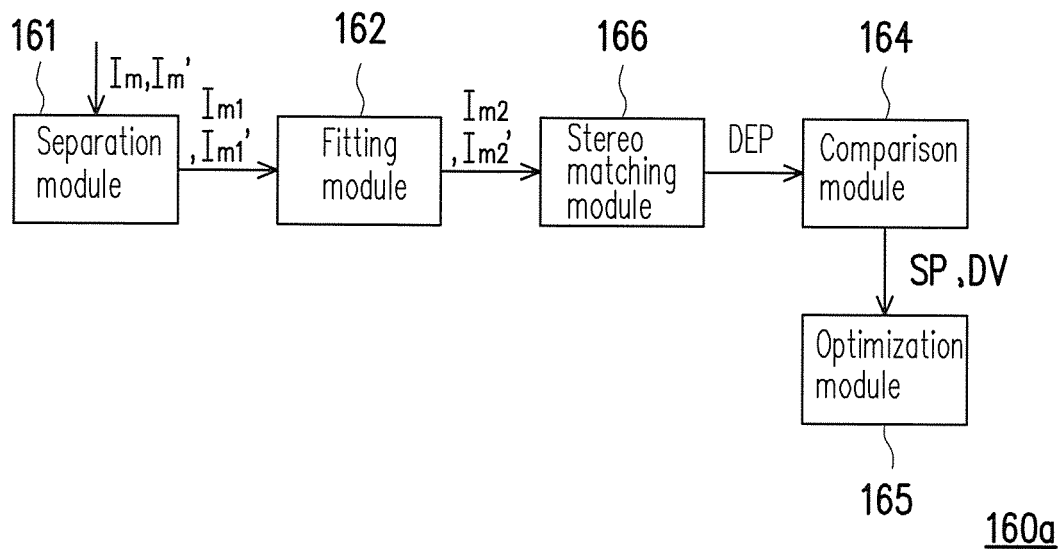
FIG. 4B is a schematic diagram of a calibration module according to another embodiment of the disclosure.
Figure 5B:
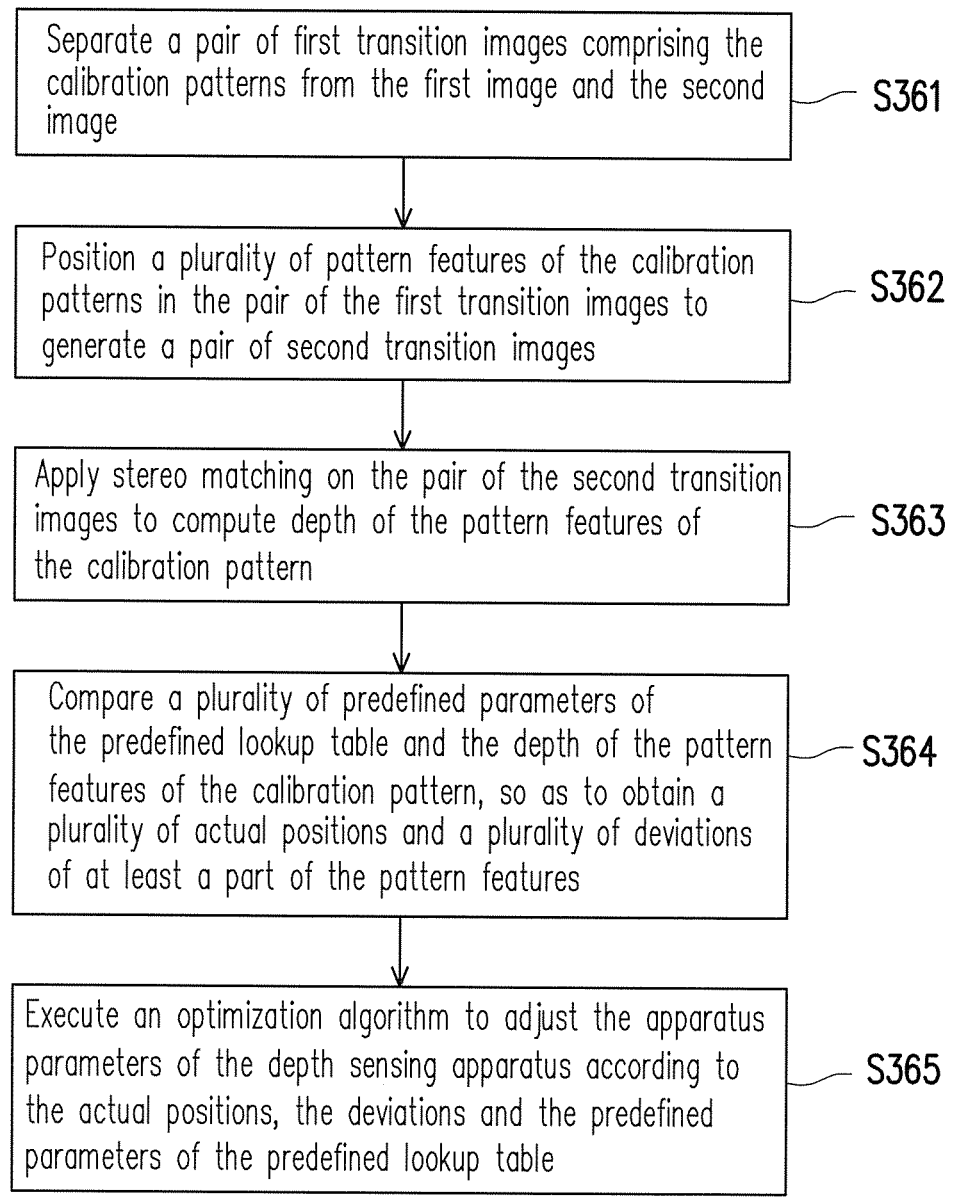
FIG. 5B is a flowchart illustrating another method for adjusting apparatus parameters according to a calibration pattern, a predefined calibration pattern and a predefined lookup table corresponding to the predefined calibration pattern.

FIG. 4B is a schematic diagram of a calibration module according to another embodiment of the disclosure. FIG. 5B is a flowchart illustrating another method for adjusting apparatus parameters according to the calibration pattern, the predefined calibration pattern and the predefined lookup table corresponding to the predefined calibration pattern. Referring to FIG. 4B and FIG. 5B, compared to the calibration module 160 in the depth sensing apparatus 100, calibration module 160a in the depth sensing apparatus 100a includes a stereo matching module 166, and the trapezoid correction module 163 is replaced by the stereo matching module 166.

To be more specific, in the present embodiment, the separation module 161 is coupled to the image capturing apparatuses 140, 180. When the calibration module 160a receives the images $I_m$, $I_m'$ including the calibration patterns and the depth computation patterns from the image capturing apparatuses 140, 180, the separation module 161 separates a pair of first transition images $I_{m1}$, $I_{m1}'$ comprising the calibration patterns from the images $I_{m1}$, $I_m'$ (step S361). Next, the fitting module 162 coupled to the separation module 161 receives the pair of the first transition images $I_{m1}$, $I_{m1}'$, and positions a plurality of pattern features of the calibration patterns in the pair of the first transition images $I_{m1}$, $I_{m1}'$ to generate a pair of second transition images $I_{m2}$, $I_{m2}'$ (step S362).

The stereo matching module 166 coupled to the fitting module 162 receives the pair of the second transition images $I_{m2}$, $I_{m2}'$, and applies stereo matching on the pair of the second transition images $I_{m2}$, $I_{m2}'$ to compute depth DEP of the pattern features of the calibration pattern (step S363). The comparison module 164 coupled to the stereo matching module 166 receives the depth DEP of the pattern features of the calibration pattern, and compares a plurality of predefined parameters of the predefined lookup table and the depth DEP of the pattern features of the calibration pattern, so as to obtain a plurality of actual positions SP and a plurality of deviations DV of at least a part of the pattern features (step S364).

Lastly, the optimization module 165 coupled to the comparison module 164 receives the obtained actual positions SP and the deviations DV of the at least a part of the pattern features, and executes an optimization algorithm to adjust the apparatus parameters of the depth sensing apparatus 100a according to the actual positions SP, the deviations DV and the predefined parameters of the predefined lookup table (step S365).

Figure 6B:
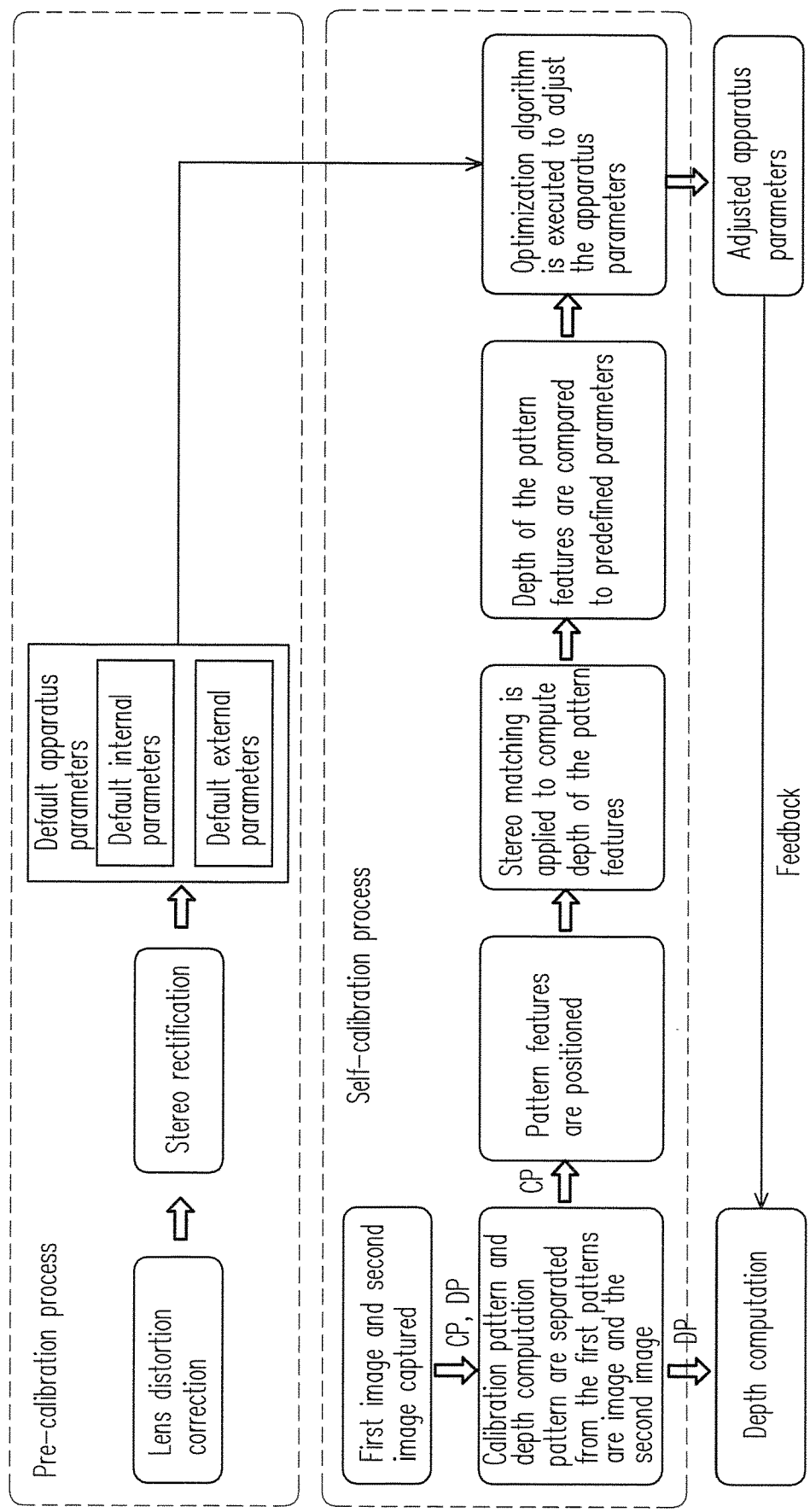
FIG. 6B is a schematic diagram of a calibration process according to another embodiment of the disclosure.

FIG. 6B is a schematic diagram of a calibration process according to another embodiment of the disclosure. Referring to FIG. 6B, the self-calibration process may be performed by the depth sensing apparatus 100a shown in FIG. 1B and FIG. 4B. Compared to the self-calibration process in FIG. 6A, within the self-calibration process shown in FIG. 6B, two images (the first image and the second image) including the calibration patterns CP and the depth computation patterns DP are captured, and a pair of the first transition images including the calibration patterns CP are separated from the images. After the pair of the first transition images including the calibration pattern CP are obtained, the remain procedure of the self-calibration process shown in FIG. 6B is then performed on the pair of the first transition image. The detail of the self-calibration process is already illustrated in FIG. 4B, FIG. 5B and the related embodiments, so it is not repeated herein. Further, the detail of the pre-calibration process and the computation of the depth information could be referred from FIG. 6A and the related embodiments, so it is not repeated herein as well.

In summary, in the depth sensing apparatus with self-calibration and the self-calibration method provided by the embodiments of the disclosure, the calibration pattern and the depth computation pattern are first projected to the reference plane to capture an image including the calibration pattern and the depth computation pattern. Then, the apparatus parameters of the depth sensing apparatus are adjusted to calibrate the depth computation deviation according to the calibration pattern, the predefined calibration pattern and the predefined lookup table. In this way, the depth sensing apparatus is able to efficiently perform self-calibration in real-time, so as to maintain accuracy of the depth information in calculation. Further, in another proposed depth sensing apparatus, multiple images including the calibration patterns and the depth computation patterns are captured and used in adjusting the apparatus parameters of the depth sensing apparatus to calibrate the depth computation deviation.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A depth sensing apparatus with self-calibration, comprising:
    a projector, projecting a calibration pattern and a depth computation pattern to a reference plane based on a predefined calibration pattern and a predefined depth computation pattern, wherein the calibration pattern is merged with the depth computation pattern;
    an image camera, capturing an image comprising the calibration pattern and the depth computation pattern; and
    a processor, coupled to the image camera, and configured to execute a plurality of modules to adjust a plurality of apparatus parameters of the depth sensing apparatus to calibrate a depth computation deviation of depth information sensed by the depth sensing apparatus according to the calibration pattern of the image, the predefined calibration pattern and a constant predefined lookup table corresponding to the predefined calibration pattern,
    wherein the calibration pattern is projected according to the predefined calibration pattern,
    wherein the processor is configured to execute the modules to separate a first transition image comprising the calibration pattern from the image,
    wherein the processor is further configured to execute the modules to:
        position a plurality of pattern features of the calibration pattern of the first transition image to generate a second transition image;
        correct a trapezoid distortion of the second transition image to generate a third transition image;
        compare a plurality of predefined parameters of the constant predefined lookup table and a plurality of geometric relations between the pattern features of the third transition image, so as to obtain a plurality of actual positions and a plurality of deviations of at least a part of the pattern features; and
        execute an optimization algorithm to adjust the apparatus parameters of the depth sensing apparatus according to the actual positions, the deviations and the predefined parameters of the constant predefined lookup table.

2. The depth sensing apparatus with self-calibration as claimed in claim 1, wherein the processor is configured to execute the modules to separate the first transition image having the calibration pattern by determining a connectivity property of each pixel to a plurality of neighboring pixels according to the number of the neighboring pixels neighbored to each pixel, excluding the pixels with weak connectivity, and executing an erosion algorithm to the pixels with strong connectivity, wherein the number of the neighboring pixels of the pixels with the weak connectivity is not greater than a threshold, and the number of the neighboring pixels of the pixels with the strong connectivity is greater than the threshold.

3. The depth sensing apparatus with self-calibration as claimed in claim 1, wherein the processor is configured to execute the modules to position the pattern features of the calibration pattern by comparing the predefined calibration pattern with the first transition image.

4. The depth sensing apparatus with self-calibration as claimed in claim 1, wherein the processor is configured to execute the modules to position the pattern features of the calibration pattern by comparing the constant predefined lookup table with the first transition image.

5. The depth sensing apparatus with se calibration as claimed in claim 1, wherein the processor is configured to execute the modules to calculate the actual positions of the pattern features in the third transition image and the geometric relations between the pattern features, and compares the actual positions, the geometric relations and the predefined parameters of the constant predefined lookup table to obtain the deviations of the pattern features.

6. The depth sensing apparatus with self-calibration as claimed in claim 1, wherein the predefined parameters of the constant predefined lookup table comprise a plurality of previous positions of a plurality of previous pattern features of a plurality of previous calibration patterns in a plurality of previous images and a plurality of previous geometric relations between the previous pattern features, and the previous calibration patterns are respectively projected to a predefined plane by the depth sensing apparatus under a plurality of different known skew angles and a plurality of different known distances.

7. The depth sensing apparatus with self-calibration as claimed in claim 1, wherein the processor is configured to execute an optimization algorithm to obtain a plurality of calibrated apparatus parameters of the depth sensing apparatus, and the processor is configured to take the calibrated apparatus parameters as the apparatus parameters of the depth sensing apparatus to calibrate the depth computation deviation.

8. A self-calibration method, adapted to a depth sensing apparatus, comprising:
    projecting a calibration pattern and a depth computation pattern to a reference plane based on a predefined calibration pattern and a predefined depth computation pattern, wherein the calibration pattern is merged with the depth computation pattern;
    capturing an image including the calibration pattern and the depth computation pattern; and
    adjusting a plurality of apparatus parameters of the depth sensing apparatus to calibrate a depth computation deviation of depth information sensed by the depth sensing apparatus according to the calibration pattern of the image, the predefined calibration pattern and a constant predefined lookup table corresponding to the predefined calibration pattern,
    wherein the calibration pattern is projected according to the predefined calibration pattern,
    wherein the step of adjusting the apparatus parameters of the depth sensing apparatus to calibrate the depth computation deviation comprises separating a first transition image comprising the calibration pattern from the image,
    wherein the step of adjusting the apparatus parameters of the depth sensing apparatus to calibrate the depth computation deviation further comprises:
    positioning a plurality of pattern features of the calibration pattern of the first transition image to generate a second transition image;
    correcting a trapezoid distortion of the second transition image to generate a third transition image;

comparing a plurality of predefined parameters of the constant predefined lookup table and a plurality of geometric relations between the pattern features of the third transition image, so as to obtain a plurality of actual positions and a plurality of deviations of at least a part of the pattern features; and executing an optimization algorithm to adjust the apparatus parameters of the depth sensing apparatus according to the actual positions, the deviations and the predefined parameters of the constant predefined lookup table.

9. The self-calibration method as claimed in claim 8, wherein the step of separating the first transition image from the image comprises:

determining a connectivity property of each pixel to a plurality of neighboring pixels according to the number of the neighboring pixels neighbored to each pixel;

excluding the pixels with weak connectivity in the image; and executing an erosion algorithm to the pixels with strong connectivity to separate the first transition image having the calibration pattern;

wherein the number of the neighboring pixels of the pixels with the weak connectivity is not greater than a threshold, and the number of the neighboring pixels of the pixels with the strong connectivity is greater than the threshold.

10. The self-calibration method as claimed in claim 8, wherein the step of positioning the pattern features of the calibration pattern of the first transition image to generate the second transition image comprises:

comparing the predefined calibration pattern with the first transition image to position the pattern features of the calibration pattern.

11. The self-calibration method as claimed in claim 9, wherein the step of positioning the pattern features of calibration pattern of the first transition image to generate the second transition image comprises:

comparing the constant predefined lookup table with the first transition image to position the pattern features of the calibration pattern.

12. The self-calibration method as claimed in claim 8, wherein the step of obtaining the actual positions and the deviations of the at least a part of the pattern features comprises: calculating the actual positions of the pattern features in the third transition image and the geometric relations between the pattern features; and comparing the actual positions, the geometric relations and the predefined parameters of the constant predefined lookup table to obtain the deviations of the pattern features.

13. The self-calibration method as claimed in claim 8, wherein the predefined parameters of the constant predefined lookup table comprise a plurality of previous positions of a plurality of previous pattern features of a plurality of previous calibration patterns in a plurality of previous images and a plurality of previous geometric relations between the previous pattern features, and the previous calibration patterns are respectively projected to a predefined plane by the depth sensing apparatus under a plurality of different known skew angles and a plurality of different known distances.

14. The self-calibration method as claimed in claim 8, wherein the step of executing the optimization algorithm to adjust the apparatus parameters of the depth sensing apparatus comprises:

executing an optimization algorithm to obtain a plurality of calibrated apparatus parameters of the depth sensing apparatus; and taking the calibrated apparatus parameters as the apparatus parameters of the depth sensing apparatus to calibrate the depth computation deviation.

* * * * *